Oct. 7, 1969     R. A. REMNER     3,470,723

STRAND HANDLING APPARATUS

Filed Sept. 28, 1966     5 Sheets-Sheet 1

INVENTOR.
ROBERT A. REMNER
BY Bosworth, Sessions,
Herrstrom & Knowles
ATTORNEYS.

INVENTOR.
ROBERT A. REMNER
BY Bosworth, Sessions,
Herrstrom & Knowles
ATTORNEYS.

United States Patent Office 3,470,723
Patented Oct. 7, 1969

3,470,723
STRAND HANDLING APPARATUS
Robert A. Remner, Glenshaw, Pa., assignor to Blaw-Knox Company, Pittsburgh, Pa., a corporation of Delaware
Filed Sept. 28, 1966, Ser. No. 582,723
Int. Cl. B21c 1/02
U.S. Cl. 72—291                             11 Claims

ABSTRACT OF THE DISCLOSURE

Strand handling apparatus, such as apparatus for drawing metal rods or tubing, having a rotatable drum on the periphery of which the strand is wound, a gripper carried by the drum for gripping the leading end of the strand, payoff means for guiding the leading end portion of the strand leaving the drum to a predetermined location, and strand shifting means carried by the drum for engaging the leading end portion of the strand and moving it generally axially of the drum into alignment with the payoff means.

---

This invention relates to a continuous rod drawing apparatus and more particularly to an apparatus in which materials such as long lengths of metal rod or tubing (hereinafter sometimes referred to as "strand") are drawn through a die by means of a capstan drum and then the leading end of the rod is passed from the capstan to a succeeding unit of the apparatus.

The invention makes it possible to guide and feed the leading end of a bar, for example, that is being drawn by a capstan through a die into a succeeding piece of apparatus. The bar is wound for several turns around the capstan and after the required number of turns have been wound, the leading end of the bar is guided to a succeeding apparatus without stopping the drawing operation. This makes possible a continuous line in which a length of strand such as a bar is paid off from a reel, reduced in diameter by a die through which it is drawn by a capstan drum and, without interrupting the drawing operation, the leading end of the strand is withdrawn from the drum and fed and guided to a following apparatus, such as a straightener.

According to the invention, a rotating capstan drum that is adapted to draw strand through a die has mounted on it a gripper for gripping the leading end of the strand, and has associated with the drum means for causing the strand traveling onto the drum to wind on the drum in a single layer of helical turns. The capstan drum also carries means for moving the leading end of the strand axially of the drum to a position where such leading end can pass through an outlet guide from which it passes to means for feeding the leading end to a predetermined location. Preferably rolls are associated with the capstan to seize the leading end of the strand as it leaves the guide and pass it through the guide in a predetermined path.

An object of the invention is the provision of apparatus for guiding and feeding the lead end of a strand material wound helically on a drum from the drum to a predetermined path in which it can pass to a succeeding apparatus.

Further objects and advantages of the invention will become apparent from the following description of a preferred form of the invention, reference being made to the accompanying drawings. In the drawings.

Figure 1:
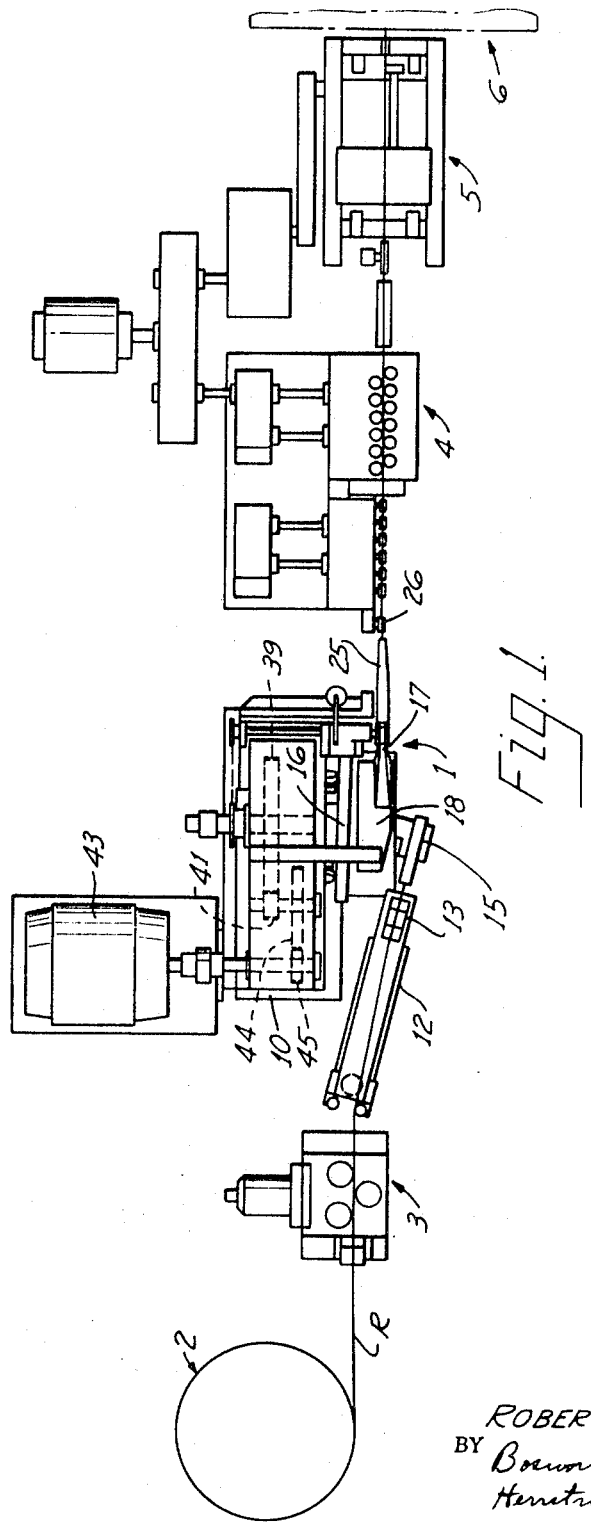
FIGURE 1 is a plan of a processing line for reducing the diameter of a strand, straightening it, and cutting it to length, this processing line including apparatus embodying the invention.

*General arrangement.*—FIGURE 1 depicts diagrammatically a portion of a processing line for continuously reducing the diameter of a rod R, straightening it, and cutting it to length. The apparatus includes a drawing unit 1 embodying the invention. The rod R is supplied by a payoff reel 2 and passes through a conventional prestraightener unit 3 that straightens the rod; it then passes to the drawing unit 1 that draws the rod to a smaller cross section, after which it passes to a conventional two-plane straightening unit 4 having sets of straightening rollers at right angles to each other, and then to a flying saw 5 that cuts it to length. The cut lengths pass to a saw outlet table 6 from which they are discharged. All apparatus except that embodied in draw unit 1 is conventional and needs no further description.

Figure 2:
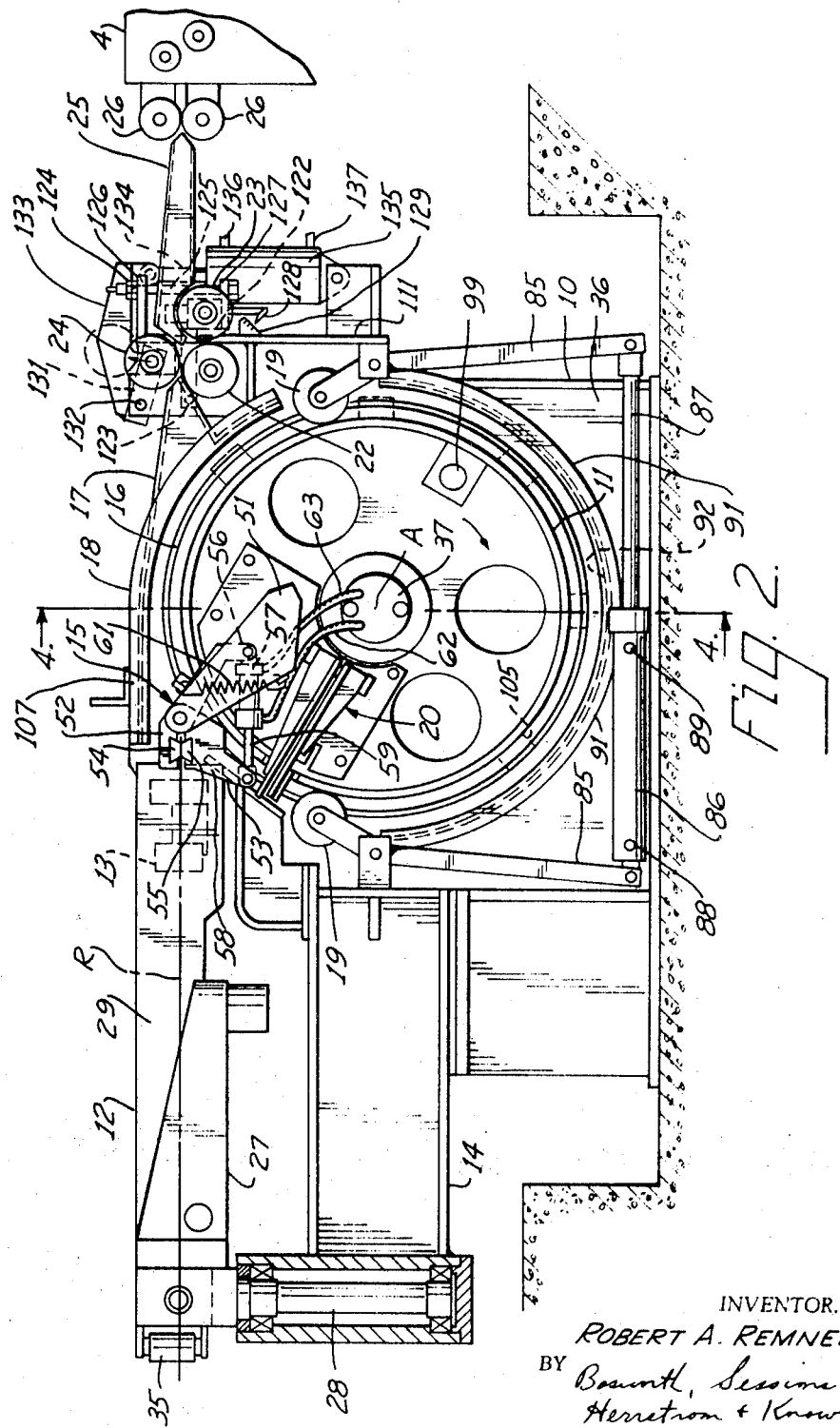
FIGURE 2 is a front elevation of drawing apparatus embodying the invention, to a larger scale than FIGURE 1.

The apparatus 1, as shown in FIGURE 2, comprises a supporting base 10 rotatably carrying a power-driven capstan drum 11, rotatable about a fixed horizontal axis, that operates at automatically controlled speeds and cycles of starting and stopping. A dieholder arm 12 carrying die means 13 is pivotally mounted on a support 14 to swing in a generally horizontal plane about a generally vertical axis spaced from the drum in the direction toward payoff reel 2.

In order to wind the required number of turns on the drum 11, a gripper 15 is mounted on the drum. The gripper firmly grasps the leading end of the rod R after it has been passed through the die means and holds it as the drum rotates to wind a predetermined number of helical turns of the rod in a single layer on the drum. The dieholder arm 12, which is in the position shown in full lines in FIGURE 1 and in broken lines in FIGURE 3 when the gripper first grasps the leading end of the rod, swings about its vertical pivot to follow the rod as it is wrapped in helical turns on the drum. After the proper number of turns of rod has been wound on the drum, the dieholder arm has moved to the position shown in full lines in FIGURE 3 and the rod leaving the die means 13 travels in a path lying substantially in a plane that is normal to the axis of rotation of the drum. Up to this time the turns of rod R on the drum are widely spaced and extend from the base or inner end of the drum toward the gripper, or free, end of the drum.

In order to force turns of rod toward the free end of the drum as they are wound on the drum, a rotating plow 16 is mounted about the drum to rotate with the drum in a plane at an angle to the axis of rotation of the drum. The rotating plow forces the turns away from the base of the drum so that each increment of bar wound onto the drum directly engages the surface of the drum. The operation is continued until the proper number of turns have been wound onto the drum in a single layer of abutting helical turns, and the gripped or leading end of the rod is in position to be paid off the drum through an outlet guide 17 forming part of a guard 18.

After a predetermined number of turns, depending on the diameter of the bar, have been wound on the drum, the drum is slowed to a feed speed and snubber rolls 19 are then swung toward the drum to force the turns of rod on the drum in close contact with the drum to insure that after the gripper has released, all wound portions of the rod will be maintained properly on the drum. Thereafter, when the gripper is at a suitable location, a strand shifting means 20 is actuated to contact the leading end portion of the rod, which is still gripped. The gripper is then caused to release the leading end of the rod, and the means 20 continues its motion to move the leading end of the rod out of the gripper and beneath guard 18 extending over the upper portion of the capstan.

The shifting means 20 is retracted after the free leading end of the rod contacts the inside of outlet guide 17. As the drum continues to rotate, the leading end of the rod R is fed through the outlet guide 17 onto a power-driven feed roll 22 and an adjustable deflector roll 23. As soon as the leading end of the rod passes roll 22, a feed pinch roll 24 is operated to pinch the rod between rolls 22 and 24. Driven feed roll 22 now drives the end of the rod through a discharge guide 25 into the pinch rolls 26 of straightener 4 without appreciable loosening of the turns of rod on the drum. The rod R is, of course, drawn through the die means 13 and reduced as it passes to the drum 11.

As soon as straightener 4 has a good grip on the leading end of the rod, snubber rolls 19 are retracted from the drum and the drawing operation is continued at full operating speed until the payoff reel 2 is empty and another reel must be substituted, after which the procedure may be repeated.

Figure 3:
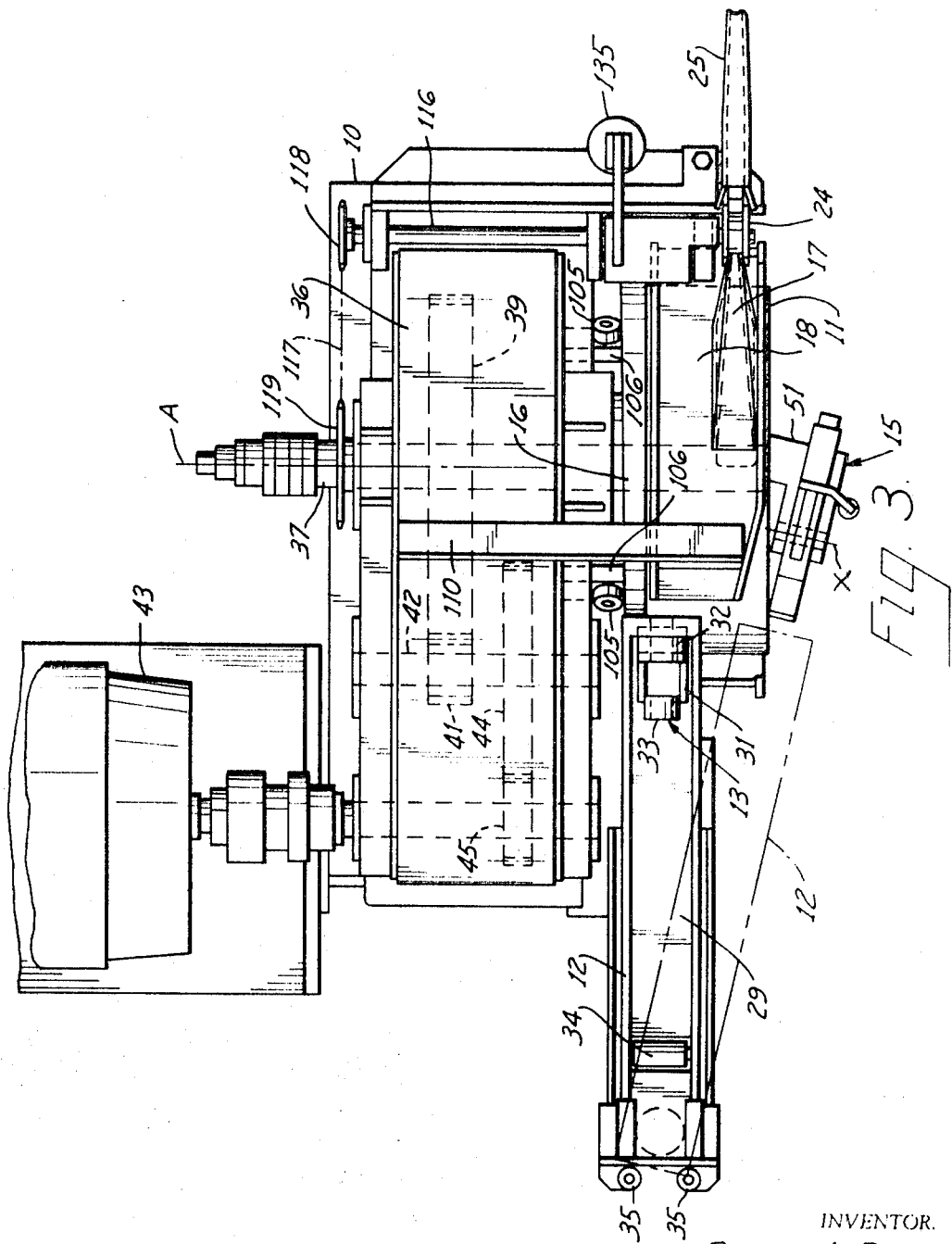
FIGURE 3 is a plan of the apparatus of FIGURE 2 to the same scale.

*Die support.*—As shown in FIGURES 1, 2 and 3, the die-holder arm 12 comprises a bracket 27 that is rigidly fixed to a shaft 28 that is pivotally mounted in a stationary bracket 14 forming part of the base 10 of the apparatus. Bracket 27 carries a channel-sectioned member 29 that at its end nearest the capstan carries the die means 13 comprising a die box 31 carrying a manually changeable draw die 32 and a guide 33. Member 29 also has a freely rotatable horizontal roll 34 and freely rotatable upright rolls 35 for guiding and supporting the rod R as it passes to the dies from the payoff reel.

At the start of the operation, the dieholder arm 12 is manually moved from its operating position shown in full lines to the position shown in broken lines in FIGURE 3 in which its dies are aligned with the jaws of the gripper 15; the arm is moved to its operating position by action of the rod R as it is wound on the capstan drum to align itself to the shortest distance between the dies and the drum.

*Capstan drum and associated mechanism.*—FIGURES 1, 2, 3 and 4 illustrate the structure of the capstan drum 11 and its supporting and driving means. The drum is supported by a shaft 37 that is journaled in a housing 36. The shaft 37 has a tapered outboard end 38 on which the drum 11 is fixed. Shaft 37 is driven by a gear 39 that meshes with a pinion 41 mounted on a jack shaft 42. The jack shaft is driven by a motor 43 through gear 44 and pinion 45.

Drum 11 comprises a hub 46 that is mounted on the free end of shaft 37, a front wall 47 fixed to the hub and a generally cylindrical outer member 48 secured to wall 47. Member 48 is also supported by radially-extending spoke members 49 (FIGURE 4) which are fixed to the hub and to the front wall and the outer member to support and strengthen them.

The gripper 15 comprises (FIGURES 1, 2 and 3) a bracket 51 fixed to the outside of front wall 47 of the drum and pivotally carrying an outer gripper jaw member 52 and an inner gripper jaw member 53, respectively carrying removable jaw inserts 54 and 55. Jaw member 52 has an arm 56 to which is pivotally connected a fluid-operated cylinder 57; jaw member 53 has an arm 58 to which is pivotally connected the piston rod 59 of cylinder 57. Jaw member 52, moreover, is biased toward a predetermined location by a tension spring 61 operating between arm 56 and bracket 51. Furthermore, as shown in FIGURE 3, the axis X about which jaw members 52 and 53 are pivotally mounted is inclined to the axis A of rotation of the drum so that the jaw members can grasp the leading end of the rod R projecting from the dieholder arm 12 when it is in its angled position as shown in broken lines in FIGURE 3.

Fluid, preferably air under pressure, actuates the cylinder 57 to extend its piston rod to cause the jaw members 52 and 53 to grasp the rod R and to retract the piston rod to release the rod R. The fluid is supplied through conduits 62 and 63 that extend through the drum shaft and are connected to a suitable source through known control means at the rear end of the shaft.

Drum 11 also carries the shifting means 20 adjacent gripper 15. The shifting means follows the gripper when the drum is rotated during operation as indicated by the arrow in FIGURE 2. The shifting means comprises two arms 64 and 65 (FIGURES 4–7) that are pivotally mounted about a common axis in a bracket 66 fixed to the outside of the front wall of the drum. Arm 64, which may be termed a pusher arm, has a pusher portion 67 at its upper end that is adapted, when the arm is in operative position, to extend a short distance inwardly of the drum into a slot 68 in the front wall and outer cylindrical member of the drum. This arm is moved between its extended position (FIGURE 5) and its retracted position (FIGURE 7) by a fluid-operated cylinder 69 pivotally mounted inside the capstan and having a piston rod 71 extending outwardly through the front wall of the drum and pivotally connected to the arm 64.

Figure 5:
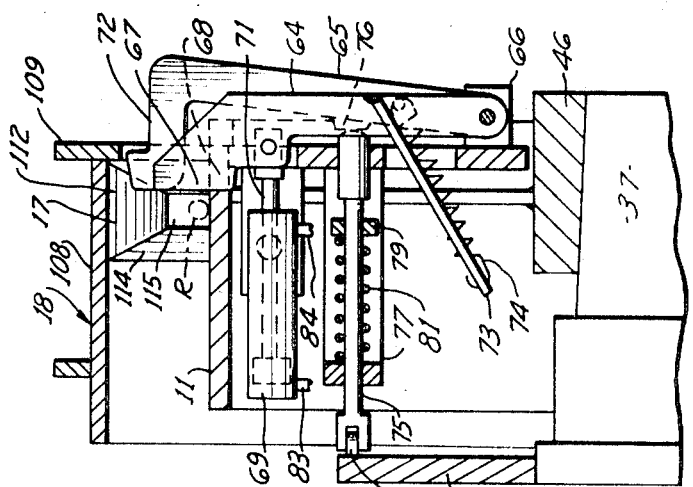
FIGURE 5 is a section through a portion of the apparatus generally along line 4—4, but to a larger scale, showing strand shifting means in its retracted position.
Figure 6:
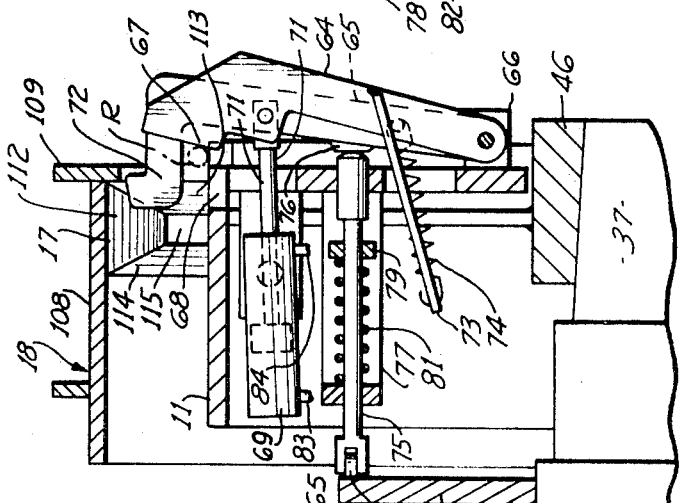
FIGURE 6 is a section similar to that of FIGURE 5 showing the strand shifting means in an intermediate position.
Figure 7:
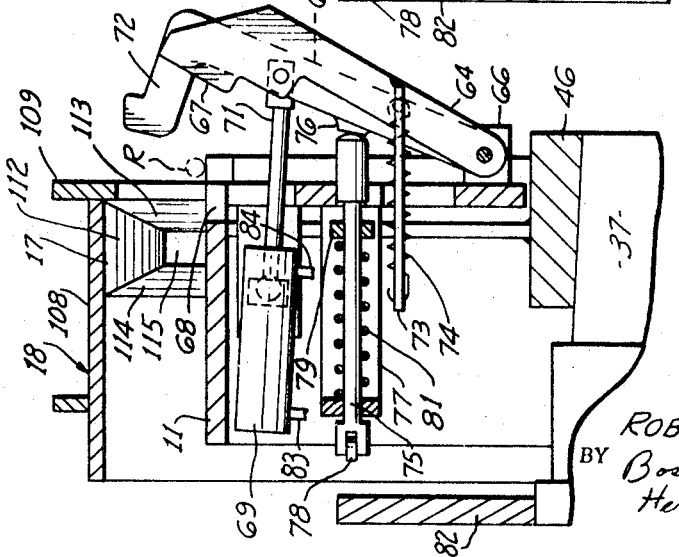
FIGURE 7 is a view similar to that of FIGURES 5 and 6 showing the strand shifting means in its final position for moving the strand through the guide means.

The other arm 65, which may be termed a guide arm, has a laterally-extending portion 72 adapted to clear the drum when the arm is in its retracted position (FIGURE 5) and to extend a substantial distance over the cylindrical surface of the drum when the arm is in its operative position (FIGURES 6 and 7). Arm 65 is moved from its retracted position to its operative position by action of the pusher arm 64 and itself moves the pusher arm from its operative to its retracted position. Guide arm 65, however, is pivotally movable independently of arm 64; this is possible because a bar 73, rigidly fixed to arm 64, carries one end of a relatively strong tension spring 74, the other end of which is connected to guide arm 65 to bias arm 65 toward arm 64. Movement of guide arm 65 toward its operative position is limited by a plunger 75. One end of plunger 75 slidably engages a hole in the front wall of the drum and projects to contact a boss 76 on the guide arm, and the other end of the plunger projects through a bracket 77 fixed to the drum 11 and terminating in a roller 78. The plunger member also carries a stop member 79 fixed thereto; a compression type spring 81 exerting weaker force than the spring 74 extends between bracket 77 and the stop member 79 to bias the plunger member outwardly toward guide arm 65. Roller 78 engages a plate 82 at the rear of the drum to limit inward and rearward travel of the plunger member.

Conduits 83 nd 84 supply fluid, such as compressed air, to actuate cylinder 69; these conduits pass through the shaft 37 of the drum and are connected to a source of fluid through suitable known control means.

The two elongated rubber-surfaced snubber rolls 19 (FIGURE 2) are located at each side of the upper portion of the capstan drum near the drawing and threading means. Each roll 19 is long enough to extend over the surface of the drum that carries the rod turns and is freely rotatably mounted upon an axis parallel to the drum on an arm 85 pivotally supported near its upper end from base 10 of the appartus. The lower end of one of the arms 85 is pivotally connected to a fluid-actuated cylinder 86 having a piston rod 87 to which the lower end of the other arm 85 is pivotally connected. Conduits 88 and 89 supply fluid, such as compressed air, to the cylinder to actuate it to cause the arms to press the snubber rollers 19 toward the capstan to hold the rod turns thereon or to retract them away from the capstan when required, suitable known control means being provided for the purpose.

A channel-shaped safety shield 91 having a curved inner surface 92 and a front wall 93 is fixed below the drum 11.

*Rotating plow.*—The rotating plow 16 (FIGURES 2, 3 and 4) comprises an annular continuous plow ring 94 located outside and around the outer member 48 of the drum. This ring is supported by a disc 95 suitably apertured to clear the parts of the shifting means 20. Disc 95 has an interior bearing surface 96 that is a zone of a sphere; this bearing surface is adapted to engage and be supported by bearing member 97 rigidly fixed to the shaft 37 and having an outer convex bearing surface 98 that is a zone of the sphere matching the concave surface 96. Disc 95 is caused to rotate in unison with the capstan drum by a pin 99 that projects through an opening 101 in member 95 and is rigidly fixed in bracket 102 fixed to the inside of the drum.

The rear of member 95 has at its outer edge a surface 103 that lies in a plane that is substantially parallel to a plane containing the front surface 104 of the plow ring 94. This surface 103 contacts several freely rotatable rollers 105 that are angularly mounted in brackets 106 fixed to the base 10 of the apparatus so that member 93 and hence the front surface 104 of plow ring 94 will always rotate in a fixed plane that is inclined to the axis of rotation of the drum, the position, direction and degree of inclination being such that when the rod R is passing to the drum in a plane normal to the axis of rotation of the drum, the first turn of the rod winding on the drum clears the plow ring at the top of the drum but thereafter is engaged by the plow ring and pushed axially of the drum toward its outer or free end. Each turn also pushes the next adjacent previously applied turn, and so on, so that all turns are moved axially of the drum as it rotates and additional rod is wound on it.

Figure 4:
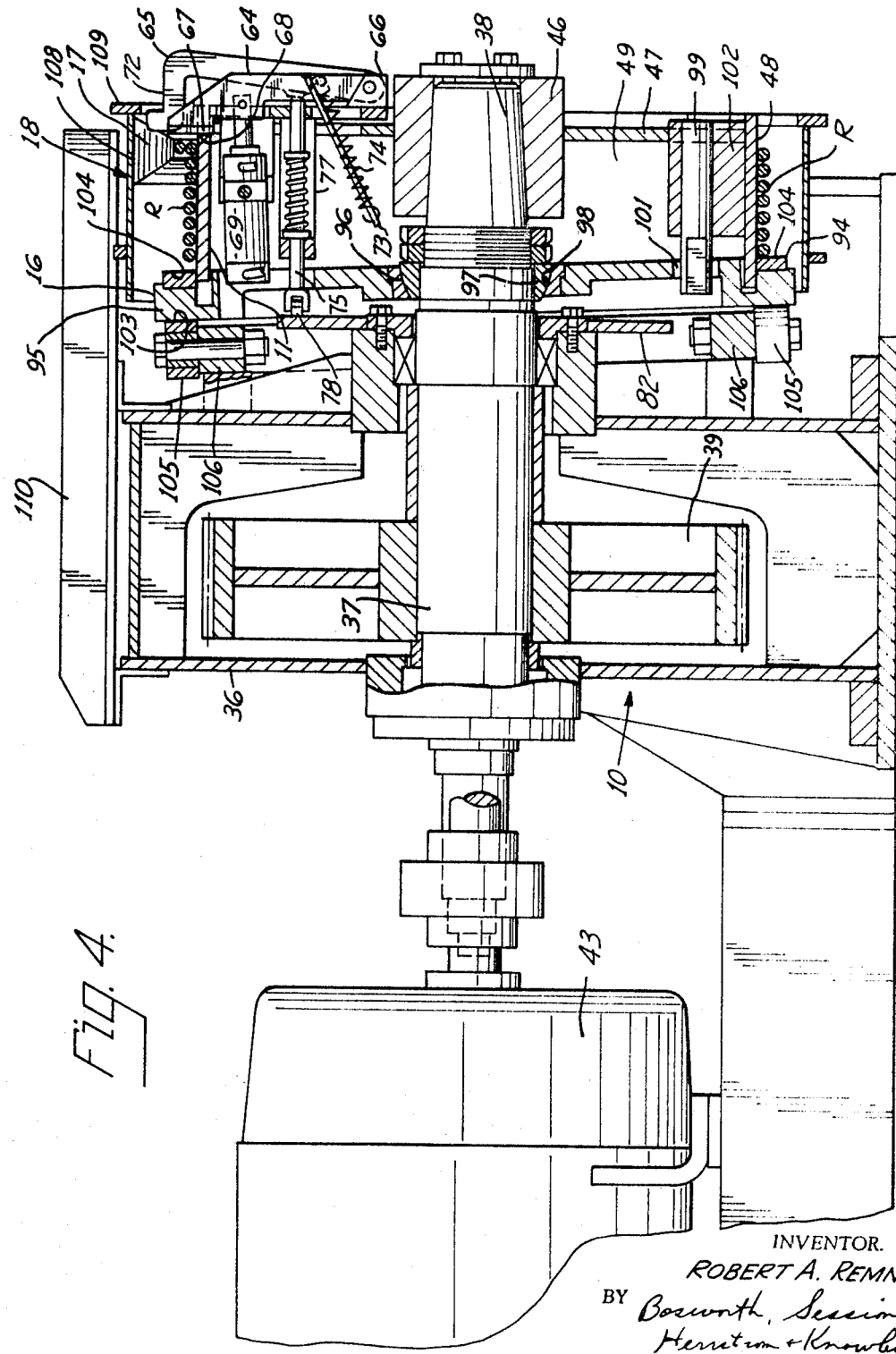
FIGURE 4 is a section generally along the line 4—4 of FIGURE 2, but to a larger scale.

*Threading means.*—As shown in FIGURES 2 to 7, the upper guard 18 extends over the upper portion of the capstan drum, essentially from the free end of the dieholder arm 12 when it is in its drawing position to the right-hand snubber roll 19. For most of its length, the guard is rather close to the curved outer member 48 of the drum, the spacing being sufficient to permit the rod R and the upper end of guide arm 65 to pass under it; however, the portion 107 nearer the dieholder arm 12 is generally tangential and horizontal. The guard has an outer wall 108 having an undersurface that extends axially of the drum and is adapted to be engaged by the rod R in the threading operation, and a front marginal wall 109 having an inner surface extending radially from the undersurface of lateral wall 108 to prevent the rod R from springing outwardly toward the free end of the drum once it engages the guard. The guard is supported from the base 10 of the machine by a frame member 110 and a bracket 111 fixed to the base (FIGURES 2, 3 and 4).

Guard 18 also includes the rigidly attached funnel-shaped outlet guide 17, the upper wall 112 of which constitutes a continuation of the tangential portion 107 of the guard and the sidewalls 113 of which are disposed (FIGURES 3 and 5–7) in converging relation from a wide receiving opening 114 toward a narrow discharge opening 115 to guide the end of the rod R in the proper threading direction.

Bracket 111 supports the grooved feed roll 22 (FIGURES 2 and 3) for rotation about a fixed axis; this feed roll is rigidly mounted on a shaft 116 that is positively rotated by a chain 117 passing over a sprocket 118 on shaft 116 and a sprocket 119 on the rear of drum shaft 37.

Bracket 111 also adjustably supports the grooved deflector roll 23 and discharge guide 25. Both the deflector roll 23 and guide 25 are mounted on a bracket 122 that is pivotally mounted at 123 on supporting bracket 111. The position of deflector roll 23 and its associated guide 121 is adjusted by nut 124 threaded on screw 125 passing through lug 126 on bracket 111 and bearing upwardly on lug 127 of pivotal bracket 122. The apparatus preferably includes means for indicating the position of the roll 23 and guide 25, such as the pointer 128 mounted on pivotal bracket 122 overlying a dial 129 on stationary bracket 111.

Bracket 111 also carries the grooved feed pinch roll 24 that is adapted to move between an operating position shown in full lines, and a retracted position shown in broken lines in FIGURE 2. The roll 24 is mounted on a supporting member 131 pivotally mounted on supporting bracket 111 at pivot 132; member 131 has an arm portion 133 that extends away from drum 11 and is pivotally connected to the piston rod 134 of a fluid-operated cylinder 135 pivotally connected to the fixed bracket 111. By fluid such as compressed air supplied and controlled by known means through conduits 136 and 137, the pinch roll 24 can be moved between its operating and its retracted positions as required.

*Operation.*—It is assumed that the apparatus is properly set up and adjusted for the particular size of strand material to be handled by insertion of the proper die 32, insertion of the proper size and type of gripper jaws inserts 54 and 55, and by proper adjustment of roll 23 and guide 25. In initiating the operation, the leading end of rod R is drawn from the payoff reel 2, is suitably prepared for drawing as by being pointed, passed through the prestraightener unit 3, and then over roll 34 and between the upright rolls 35 and into the channel member 29 of the dieholder arm 12. The pointed leading end of the rod is then passed manually or by suitable conventional mechanical means through the dies 32 and 33 on the dieholder arm 12, after which it is inserted between the jaws of the gripper 15, the dieholder arm 12 having been swung to the position shown in FIGURE 1 where the rod projecting from the die 32 is aligned with the gripper.

The apparatus is then actuated to close the gripper jaws so they firmly grasp the end of the rod. Clockwise rotation of the drum 11 is then started to pull the rod through the dies. As the drum rotates, the rod wraps around the drum 11 in a helix of decreasing pitch, the dieholder arm swinging across the face of the capstan to follow the helix until, after a few turns of the drum (for example, 5 or 6), the dieholder arm 12 is in the position shown in full lines in FIGURE 2 in which the rod R passes to the drum in a plane substantially normal to the axis of rotation of the drum. The dieholder arm is pulled to this position by the rod itself as it winds on the drum.

With the rod in this position, continued rotation of the drum causes the rearmost turn on the drum to contact the ring 94 of the rotating plow 16. Because of the angle of inclination of the rotating plow ring 94, the rod in the last turn is forced axially toward the free end of the drum; the rod in the last turn contacts the adjacent turn which is also pushed axially, and so on. The originally open helix of rod on the capstan is thus closed with the result that the rod is finally arranged on the drum in a single layer of abutting helical turns, there being enough space at the top of the drum between the last turn of rod on the drum and the plow ring to receive the oncoming rod.

Drawing of the rod and rotation of the drum is continued until the leading end of the rod is in the proper position to be removed from the drum and paid out from the drum to the following apparatus. The number of turns of the rod on the drum depends on the diameter of the rod, larger rods requiring fewer turns and smaller rods requiring more turns before the leading end of the rod is in the proper position. A control, which needs no description since it can readily be provided by those skilled in the art, may be used to provide the proper number of turns. Preferably, the control also controls the apparatus so that at two turns less than the selected number of turns of the rod before the leading end of the coil is to be removed, the drum is slowed to a feed speed and the snubber rolls 19 are moved inwardly to contact the turns of rod on the drum to insure that during the following events when the leading end of the rod is released, only the leading few feet of rod can unwind from the drum and the remainder will be held by the snubber rolls against the drum to prevent the coil from loosening and to provide enough friction to insure that the rod will be pulled through the dies even though the leading end of the rod is no longer gripped.

After the proper predetermined number of turns of the drum and when axis X of the gripper is about 10° past a vertical plane passing through the axis A of the drum, the control means causes the cylinder 69 of the strand shifting means 20 to move the pusher and guide arms 64 and 65 from their retracted positions shown in FIGURE 5 to the intermediate position shown in FIGURE 6 where the pusher arm 64 first contacts the still gripped rod R and the lateral portion 72 of the guide arm 65 extends over the rod. The gripper jaws 52 and 53 are then opened to release the rod. The pusher arm 64, still under the influence of the air cylinder 69, moves further toward the drum, moving the end of the rod out of the gripper and under the guard 18 and beyond the end of the lateral portion 72 of guide arm 65 to the position shown in FIGURE 7. The guide arm 65 is restrained against further inward movement by the plunger 75.

When the gripper releases the end of the rod, the portion of the rod from the left-hand snubber roll in FIGURE 2 to the rod end is free and tends to spring away from the drum due to the stiffness of the rod. The guide arm 65 prevents this springing away from taking place until the end of the rod is safely moved to the receiving opening 114 of the funnel-shaped outlet guide portion 17 of the guard 18.

After approximately 45° additional rotation of the drum, the control releases the air pressure in the cylinder 69, allowing the spring 81 to move the assembly of the arms 64 and 65 out to clear the snubber rolls 19, the spring 74 serving to move arm 64 when the plunger 75 pushes arm 65 under the force of spring 81. Meanwhile, the leading end of the rod has been in contact with the inner surfaces of the outlet guide 17 and is fed through the discharge opening 115 of the outlet guide portion 17 and along the tops of driven feed roll 22 and adjustable deflector roll 23 into discharge guide 25. At this stage, the leading portion of the rod lies loosely on these rolls.

As soon as the leading end of the rod is past the driven feed roll 22, the control means causes the cylinder 135 to move the retractable feed pinch roll 24 toward its operating position to pinch the rod between roll 24 and feed roll 22. The feed roll 22 is now positively driving the rod over the deflector roll 23 which straightens any curve that the rod might have developed from having been wrapped around the drum. The leading end of the rod then passes through the discharge guide 25 which conducts it to the pinch rolls 26 of the following straightener unit 14 without any tendency to loosen the turns of rod on the drum.

As soon as the pinch rolls 26 have a good grip on the rod, the control actuates the cylinder 86 to move the snubber rolls 19 away from the drum. As the snubber rolls swing away, the control causes the drum to speed up to the preselected drawing speed and drawing is continued until all of the rod on the payoff reel has been drawn through the apparatus.

The control may also be designed to slow up the drum and to move the snubber rolls inwardly as the tail end of the rod leaves the payoff reel, to hold the turns of rod on the drum after the tail end of the rod leaves the dies, until the tail end of the rod passes into the outlet guide portion of the guard.

Although the illustrated embodiment has been described in connection with the drawing and handling of a metal rod, it is obvious that such apparatus may be used for handling other types of strand material, such as tubing, having the requisite stiffness to permit the free end upon release to be guided into the outlet guide. The means for removing the free end from the drum can also be employed in connection with other types of apparatus than drawing apparatus, and could be used for feeding the removed end to apparatus other than that illustrated.

Those skilled in the art will appreciate that various changes and modifications can be made in the apparatus described herein by way of example, all without departing from the spirit or scope of the invention. The essential characteristics of the invention are defined in the appended claims.

I claim:

1. Apparatus for handling a relatively stiff strand comprising a rotatable drum on the periphery of which said strand is wound, gripping means carried by said rotatable drum for gripping the leading end portion of said strand, payoff means adjacent the periphery of the drum for guiding the leading end portion of the strand leaving the drum to a predetermined location, and strand shifting means carried by said drum for engaging the leading end portion of said strand between said gripping means and said drum and moving said leading end portion of said strand generally axially of the drum into alignment with said payoff means.

2. The apparatus of claim 1 comprising a guard adjacent to at least a portion of the periphery of said drum, and in which said strand shifting means moves said strand to a predetermined location axially of said drum between said guard and said drum.

3. The apparatus of claim 1 in which said payoff means includes a guide member providing a generally converging passage extending between a larger opening into which said strand enters and a smaller opening through which said strand leaves.

4. The apparatus of claim 1 in which said payoff means includes roller means for positively moving said strand as it leaves said drum.

5. The apparatus of claim 1 in which said payoff means comprises two guide members disposed in aligned relation, and drive roller means between said guide members.

6. The apparatus of claim 5 in which said second guide member is adjustable to change the direction of travel of the strand passing therethrough.

7. The apparatus of claim 1 in which said strand shifting means comprises two levers that are pivotally mounted at an end of said rotatable drum, each of said levers being independently pivotally movable with respect to the other, one of said levers having a portion adapted to engage and move a strand axially of said drum and the other of said levers having a portion adapted to overlie a strand and restrain movement of said strand radially of said drum, and means yieldably connecting said levers together.

8. The apparatus of claim 7 comprising means for drawing one of said levers so its free end moves toward said drum, said yieldable connecting means serving to move the other lever toward said drum, and means for moving one of said levers away from said drum, said connecting means serving to move the other of said levers away from said drum.

9. The apparatus of claim 1 comprising guard means adjacent to and extending along at least a portion of the strand carrying periphery of said drum, a strand discharge guide portion associated with said guard means and adapted to receive the end portion of a strand paying off from said drum and guide it to a discharge location, said strand shifting means comprising two levers that are pivotally mounted on said rotatable drum, each of said levers being independently pivotally movable with respect to the other lever, one of said levers having a portion spaced from its pivotal mounting adapted to engage and move said strand end portion axially of said drum and the other of said levers having a portion spaced from its pivotal mounting adapted to overlie said strand end portion and restrain movement of said strand portion radially of said drum, said levers including means yieldbly connecting said levers together, means for drawing one of said levers toward said drum, said yieldable connecting means serving to move the other lever toward said drum, whereby said strand is moved axially of said drum to a location between said guard and drum that is substantially aligned with said discharge guide portion, and means for moving one of said levers away from said drum, said connecting means serving to move the other of said levers away from said drum.

10. The apparatus of claim 1 comprising drawing die means, means for supporting said drawing die means for movement generally axially of said drum between a position in which a strand passing from said die means to said drum travels in a first path lying essentially in plane normal to the axis of rotation of said drum and position in which said strand travels in a second path axially displaced from said first mentioned path, said gripper means being mounted on said drum to receive said strand when it is traveling from said die means i said second path.

11. The apparatus of claim 10 comprising means fc rotating said drum to cause the strand, the end of whic is gripped by said gripper means, to wind on said drur in a plurality of turns, and plow means associated wit said drum for forcing turns of strand wound on said drur axially thereof from a position in which the strand travel in said first path until the endmost strand on said drur reaches a predetermined position axially of said drum.

References Cited
UNITED STATES PATENTS

| | | | |
|---|---|---|---|
| 3,280,611 | 10/1966 | Lathom et al. | 72—28 |
| 3,319,451 | 5/1967 | Tommarello | 72—27 |
| 3,330,146 | 7/1967 | Richards | 72—29 |

RONALD D. GREFE, Primary Examiner

U.S. Cl. X.R.

72—289